US009802613B2

(12) United States Patent
Fuehrer (10) Patent No.: US 9,802,613 B2
(45) Date of Patent: Oct. 31, 2017

(54) DRIVER ASSISTANCE SYSTEM FOR MOTOR VEHICLES

(71) Applicant: Robert Bosch GmbH, Stuttgart (DE)

(72) Inventor: Thomas Fuehrer, Struttgart-Weilimdorf (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/862,469

(22) Filed: Sep. 23, 2015

(65) Prior Publication Data

US 2016/0082971 A1  Mar. 24, 2016

(30) Foreign Application Priority Data

Sep. 23, 2014  (DE) .......................... 10 2014 219 110

(51) Int. Cl.

| G05D 1/00  | (2006.01) |
| G05D 3/00  | (2006.01) |
| G06F 7/00  | (2006.01) |
| G06F 17/00 | (2006.01) |
| B60W 30/18 | (2012.01) |
| B60W 10/20 | (2006.01) |
| B60W 30/12 | (2006.01) |
| B60W 30/16 | (2012.01) |
| B60W 40/04 | (2006.01) |
| B60W 50/14 | (2012.01) |

(Continued)

(52) U.S. Cl.
CPC ...... *B60W 30/18163* (2013.01); *B60W 10/20* (2013.01); *B60W 30/12* (2013.01); *B60W 30/162* (2013.01); *B60W 30/18145* (2013.01); *B60W 40/04* (2013.01); *B60W 50/14* (2013.01); *B60W 50/16* (2013.01); *G01C 21/34* (2013.01); *B60W 30/14* (2013.01); *B60W 2540/20* (2013.01); *B60W 2550/402* (2013.01); *G01C 21/3407* (2013.01)

(58) Field of Classification Search
CPC ....... B60C 1/346; B60C 9/00; B60K 31/0008; B60T 7/22; B60W 30/0956
USPC ................ 701/48, 25, 70, 96; 340/439, 435; 180/167
See application file for complete search history.

(56) References Cited

U.S. PATENT DOCUMENTS

| 5,521,579 | A  | * | 5/1996  | Bernhard | ........... B60K 31/0008 180/167 |
| 2009/0284360 | A1 | * | 11/2009 | Litkouhi | .................. B60Q 9/00 340/439 |

(Continued)

*Primary Examiner* — Mahmoud Ismail
(74) *Attorney, Agent, or Firm* — Norton Rose Fulbright US LLP; Gerard Messina (57) ABSTRACT

A driver assistance system for motor vehicles, having a velocity regulation function for regulating the velocity of the subject vehicle to a nominal velocity, and having an adjacent-lane monitoring function, characterized by a turning assistance function which, when the velocity regulation function is active and an incoming signal indicates an imminent turning process that requires crossing an adjacent lane, monitors the traffic in the adjacent lane with the aid of the adjacent-lane monitoring function, and, as a function of locations and velocities of traffic participants in the adjacent lane, determines a spatial and temporal window for moving into the adjacent lane and adapts the nominal velocity to this window.

13 Claims, 6 Drawing Sheets

(51) Int. Cl.
*B60W 50/16* (2012.01)
*G01C 21/34* (2006.01)
G01C 22/00 (2006.01)
B60T 7/12 (2006.01)
B60Q 1/00 (2006.01)
B60W 30/14 (2006.01)

(56) References Cited

U.S. PATENT DOCUMENTS

| | | | | |
|---|---|---|---|---|
| 2010/0217494 | A1* | 8/2010 | Heft | B60T 7/22 |
| | | | | 701/70 |
| 2012/0310465 | A1* | 12/2012 | Boatright | B60Q 1/346 |
| | | | | 701/25 |
| 2013/0054106 | A1* | 2/2013 | Schmudderich | B60W 30/0956 |
| | | | | 701/96 |
| 2013/0057397 | A1* | 3/2013 | Cutler | B62D 15/0255 |
| | | | | 340/435 |
| 2014/0005907 | A1* | 1/2014 | Bajpai | B60K 31/0008 |
| | | | | 701/96 |

\* cited by examiner

DRIVER ASSISTANCE SYSTEM FOR MOTOR VEHICLES

FIELD OF THE INVENTION

The present invention relates to a driver assistance system for motor vehicles, having a velocity regulation function for regulating the velocity of one's own vehicle to a nominal velocity, and having an adjacent-lane monitoring function.

BACKGROUND INFORMATION

Motor vehicles frequently come equipped with electronic driver assistance systems that provide the driver with vehicle guidance support. What are generally referred to as ACC systems (adaptive cruise control) are known, for example, that are used for regulating the velocity of one's own vehicle. During free travel of the vehicle, when there is no vehicle in front in one's own lane, the nominal velocity is a driver-specified velocity. If, on the other hand, a vehicle driving ahead is followed, then the distance thereto is measured using a radar sensor installed in the vehicle, for example, and one's own velocity is adapted to ensure that the vehicle driving ahead is followed at an appropriate collision-avoidance distance.

While the radar sensor of the ACC system typically only monitors the space in front of the subject vehicle, sensors, such as ultrasonic sensors, or laterally and/or rearwardly directed radar sensors are also known that are able to monitor the traffic in adjacent lanes as well. As a further driver assistance function, such sensor systems then make possible what is generally referred to as blind-spot detection (BSD), thus monitoring the blind spot laterally behind the subject vehicle. This function is enhanced by what is generally referred to as a lane change assist (LCA) function, which can be used to also record the distances and relative velocities of vehicles that are located in the adjacent lane behind the subject vehicle and are coming closer to the same. On the basis of these data, a warning can then be issued, for example, in the form of a visual warning signal that is superimposed into the exterior rearview mirror of the vehicle, for instance, when it is not safe to change into the adjacent lane.

Another known driver assistance function is a lane keeping support (LKS) which issues a warning to the driver or actively intervenes in the vehicle steering when the driver is unintentionally about to leave the lane driven in so far. The warning can be a haptic signal, for example, such as a steering wheel vibration generated by the power steering. Often, a video camera having an associated image evaluation system is provided for capturing the lane markings on the roadway. This system also serves to improve the identification of the lane traveled in by the subject vehicle in the case of multilane roadways. One's own lane can, in fact, also be indirectly inferred from the radar sensor signals if there is sufficient traffic density. However, a greater accuracy is provided by the use of a video system.

What is commonly known as a multifunction camera (MFC) is often provided as a video camera. It can be utilized for other assistance functions, as well. For example, such a camera can make it easier to classify objects that had been recognized by the radar systems, but, on the basis of the radar signals, were not able to be uniquely classified as passenger cars, trucks, two-wheeled vehicles, pedestrians or the like. In the same way, the multifunction camera makes it possible to visually recognize prohibition signs, in particular speed-limit signs.

Today, motor vehicles are also typically equipped with a navigation system. It makes possible automatic route planning on the basis of a stored electronic map. Moreover, by using a satellite-based position-finding system, for example, the navigation system identifies the location of the subject vehicle and is thus able to provide the driver with navigation information. Such navigation systems usually have their own data processing system that functions independently of the remaining assistance functions. However, the navigation system can communicate via suitable interfaces with other components of the driver assistance system, which is why it is likewise to be considered here as an integral part of the vehicle's driver assistance system.

SUMMARY

It is an object of the present invention to provide a driver assistance system having an additional assistance function that, in particular, will improve safety and ride comfort during turning processes.

This objective is achieved in accordance with the present invention by a turning assistance function which, in response to an incoming signal indicating an imminent turning process that requires crossing an adjacent lane, monitors the traffic in the adjacent lane with the aid of the adjacent-lane monitoring function, and, as a function of locations and velocities of traffic participants in the adjacent lane, determines a spatial and temporal window for moving into the adjacent lane and adapts the nominal velocity to this window.

This assistance function is helpful, for example, in situations where the subject vehicle is located in a middle or left lane of a multilane roadway, and the navigation system delivers the information that a right turn is to take place in a few hundred meters. The navigation system will then notify the driver visually and/or acoustically to give him/her the chance to get into the right adjacent lane in good time. A dangerous situation can arise when another vehicle is located in the blind spot in the adjacent lane, or when a vehicle is coming closer at a higher velocity in the adjacent lane, and the driver of the subject vehicle is not able to accurately assess the relative velocity. The known BSD and LCA systems are, in fact, able to warn the driver in such situations; however, it is then left to the driver to deactivate the velocity regulation function and to take over the longitudinal guidance of the vehicle himself/herself, for example, to reduce one's own velocity to the point where the subject vehicle drops back, behind the vehicle in the adjacent lane and is then able to slip safely into a gap in the adjacent lane.

The present invention makes it possible for the driver to be assisted by substantially automating the above described necessary actions of the driver. If at least one other vehicle is located adjacent to, in front of, or behind the subject vehicle in the adjacent lane, then a gap or a window is present in each case in front of and behind this vehicle that permits a safe moving into the adjacent lane in consideration of the necessary safety distances. The turning assistance function according to the present invention uses sensor technology that is already present for the adjacent-lane monitoring function, to identify such windows for turning into the adjacent lane; as the case may be, when a plurality of such windows are present, to select that window which makes it possible to safely move into the adjacent lane while changing the velocity of the subject vehicle to the least possible extent, and to then modify the nominal velocity for the velocity regulation function in a way that allows the subject vehicle to be moved next to this window.

Generally, the sensory components required for the turning assistance function in accordance with the present invention are already present because they are also needed for other assistance functions. The present invention may then be readily and cost-effectively implemented by appropriately programming the electronic data processing system that controls the remaining assistance functions (with the exception of the navigation system).

Analogously to the situation described above, driving situations are conceivable where the vehicle is traveling on a road having only one single lane for each direction of travel, or is already located in the rightmost lane, but a bicycle route, a pedestrian crosswalk, or a streetcar rail must be crossed for a turning process. For that reason, the term "adjacent lane" is to be understood in a general sense in this Application, and should also include traffic routes for other traffic participants, such as bicycle riders, pedestrians or rail vehicles.

Advantageous embodiments and refinements of the present invention are defined in the dependent claims.

In one advantageous specific embodiment, the signal that announces a turning process, comes from a route planning system of a navigation system. In principle, however, this signal may also have a different origin. For example, it could be manually input by the driver. If indicated, even the actuation of the turn indicator by the driver may serve to announce an imminent turning process and trigger the turning assistance function.

Adapting the nominal velocity does not necessarily signify a velocity reduction. In some cases, the most conveniently situated window for moving into the adjacent lane may also be reached by accelerating the subject vehicle, provided that existing speed limits are thereby considered. Therefore, on the basis of the data from the multifunction camera, or also the data supplied by the navigation system, the assistance function is adapted to automatically check whether there is a speed limit, and to take this information into account when selecting the most favorable window.

The windows for moving into the adjacent lane each have a front and/or a rear boundary. These boundaries are determined by the positions of the vehicles in the adjacent lane, as well as by the safety distances to be observed relative to these vehicles. It is understood that these boundaries are not static, but move relative to the subject vehicle, so that adapting the velocity of the subject vehicle generally does not suffice. Rather, is also necessary to time a suitable moment for moving into the adjacent lane. The driver assistance system may also thereby provide support, for instance by outputting acoustic, visual or haptic lane change information to the driver at the appropriate point in time.

DETAILED DESCRIPTION

Figure 1:
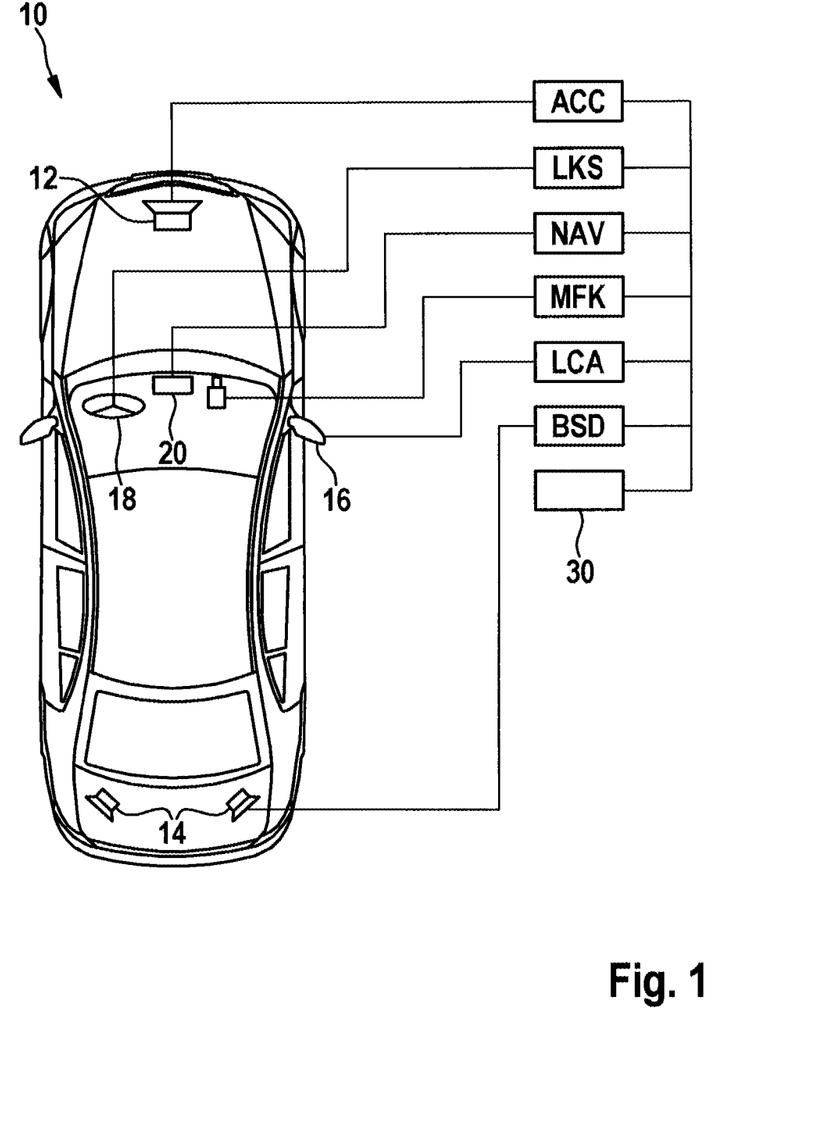
FIG. 1 is a symbolic representation of a driver assistance system for motor vehicles.

In a plan view, FIG. 1 schematically shows a motor vehicle 10 that is equipped with a driver assistance system according to the present invention. The driver assistance system is constituted in a generally known manner of an electronic data processing system or of a plurality of mutually cooperating data processing systems that receive input signals from various sensory components and transmit output signals to actuators of the motor vehicle, for example to the drive (engine and transmission management), the brake system and the steering system.

In the illustrated example, the driver assistance system encompasses a velocity regulation function ACC which, in the first place, evaluates signals from a long-range radar sensor 12 which is installed at the front of the vehicle, locates vehicles in front and other objects in the near field of the subject vehicle 10, and measures the distances and relative velocities thereof. For purposes of the assistance, a multifunction video camera MFC is provided that likewise observes the near field in front of the vehicle and delivers supplementary information about the located objects, as well as about the road-traffic infrastructure, in particular about lane markings, other traffic routes, such as bicycle routes, streetcar rails and the like, as well as, if indicated, about existing route restrictions, such as speed limits, by recognizing corresponding traffic signs in the video image.

As further assistance functions, the driver assistance system includes a blind spot detection BSD and a lane change assist LCA that evaluate the data from two further radar sensors 14 which monitor the space on one side of vehicle 10 next to and behind this vehicle, respectively. These radar sensors 14 are used, in particular, for locating vehicles and other traffic participants in an adjacent lane directly next to the lane traveled by subject vehicle 10. Radar sensors 14 are thereby also able to measure the relative velocities of the located objects. When it is derived from these data that it is not possible to safely change lanes, but the driver behavior nevertheless indicates an intended lane change, a warning to this effect is superimposed into an exterior rearview mirror 16 of the vehicle.

In addition thereto, functions BSD and LCA may also access other sensors, such as ultrasonic sensors, lidar sensors and the like. Since radar sensors 14 monitor first and foremost the space next to and behind subject vehicle 10, the data from forwardly directed radar sensor 12 may also be evaluated to additionally monitor the adjacent lane. This radar sensor 12 also captures vehicles in adjacent lanes, as long as they are located far enough in front of the subject vehicle. If these vehicles are passed and thereby disappear from the detection range of radar sensor 12, the probable locations thereof in the adjacent lane may still be estimated by extrapolating the previously measured distance and relative velocity data.

In the case of the driver assistance system described here, a lane keeping support LKS is provided as a further assistance function. This function recognizes situations where the driver of subject vehicle 10 is about to cross over the lane markings recognized by video camera MFC. It then outputs a haptic warning signal, for example by inducing a vibration of steering wheel 18 of the vehicle.

Finally, a navigation system NAV is provided as a further component of the driver assistance system. With the aid of a position-finding system (for example, GPS), it captures the actual location of subject vehicle 10 and displays this location, along with map information about the surrounding field on a screen 20. If indicated, the navigation system may also transmit information about speed limits to velocity regulation function ACC and thus ensure that the speed limits are automatically observed, provided that the driver does not override the system. Furthermore, the navigation system may be combined with a communication system that receives information wirelessly about the surrounding field of traffic and updates the same in real time.

In addition to these assistance functions, a turning assistance function 30 is provided in accordance with the present invention whose principle of operation is clarified in the following.

Figure 2:
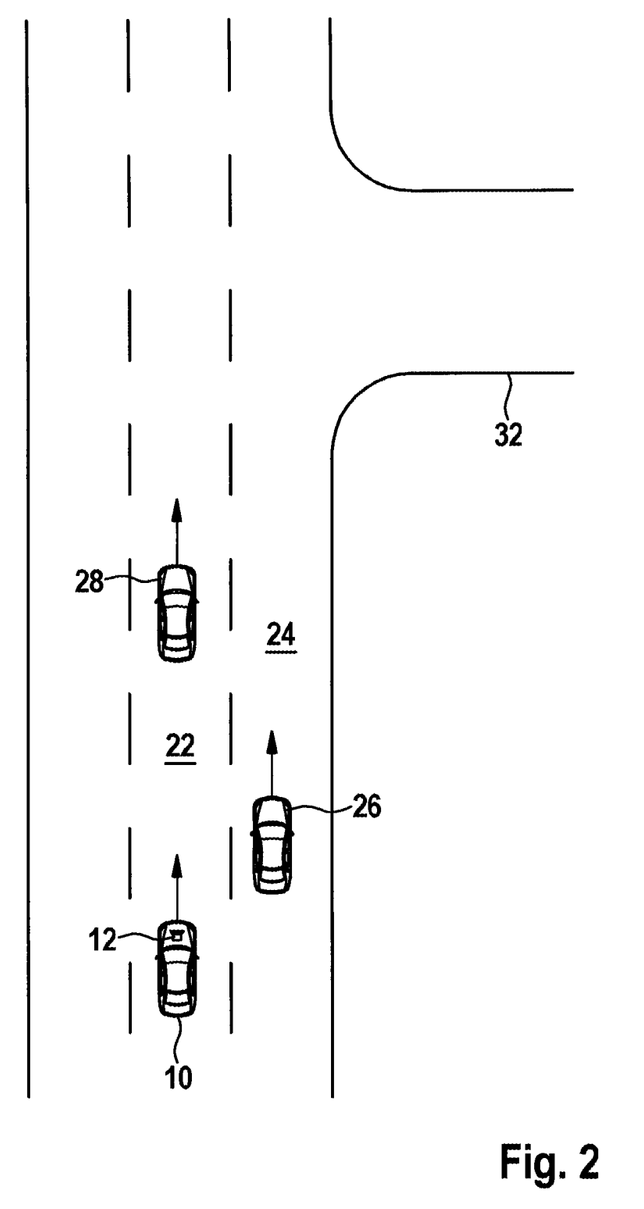
FIG. 2 is a sketch of a traffic situation for clarifying the operation of a turning assistance function.

FIG. 2 illustrates a traffic situation where vehicle 10 equipped with the driver assistance system (discernible by symbolically illustrated radar sensor 12) is traveling in a middle lane 22 and is about to pass a vehicle 26 driving in a right adjacent lane 24. Located further ahead in middle lane 22 is a another vehicle 28 that was detected by radar sensor 12. Velocity regulation function ACC regulates the velocity of vehicle 10 to ensure that vehicle 28 driving ahead is followed at an appropriate collision-avoidance distance. Thus, vehicles 10 and 28 have the same velocity, as symbolized in FIG. 2 by vector arrows.

In navigation system NAV of vehicle 10, the route guidance is active, and the navigation system alerts the driver by a voice instruction, by characters on screen display 20 or, as the case may be, also on a heads-up display, that he/she should turn off to the right into a side road 32 after a few hundred meters. The driver of vehicle 10 should, therefore, get into right adjacent lane 24. However, he/she cannot change over directly into adjacent lane 24 because he/she would then fall short of the safety distance to slower vehicle 26. On the other hand, he/she can also not complete the passing maneuver to then change into adjacent lane 24 in front of vehicle 26 because he/she would thereby fall short of the safety distance to vehicle in front 28, as well as the safety distance to (then following) vehicle 26.

In this situation, a turning assistance function 30 becomes active that cooperates with each of the previously mentioned assistance functions, as is symbolically illustrated in FIG. 1. In this exemplary case, this turning assistance function serves to reduce the nominal velocity of vehicle 10 to a value that is still below the velocity of vehicle 26 traveling in adjacent lane 24, so that, relative to vehicle 26, vehicle 10 drops back until it is able to safely swing into the adjacent lane, behind vehicle 26.

The turning assistance function does not absolutely require that velocity regulation function ACC be already activated beforehand by the driver. Even if ACC were switched off, the ACC function may be automatically activated by the turning assistance function for the purpose of temporarily adapting the velocity to the traffic in the adjacent lane. If the vehicle is not equipped with ACC, rather has only one emergency braking system (collision avoidance system), this emergency braking system may also be utilized as a velocity regulation function in order to control the deceleration of the subject vehicle within the scope of the turning assistance function.

Figure 3:
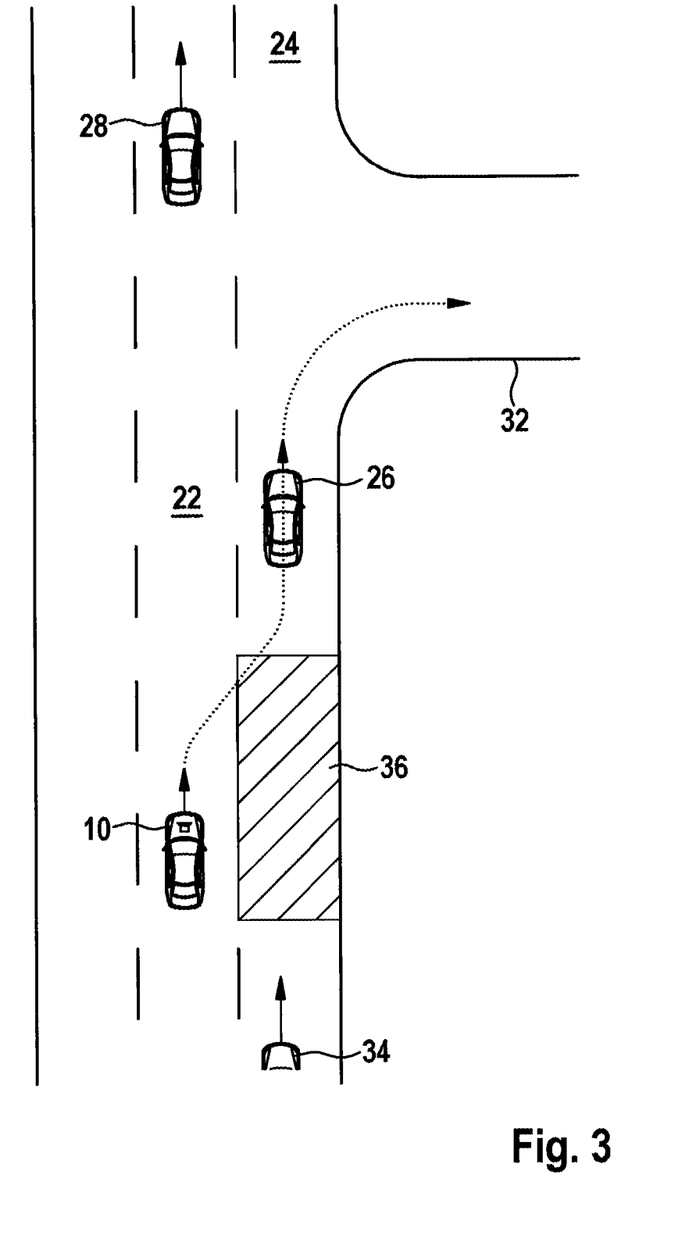
FIG. 3 is a sketch corresponding to FIG. 2 for the traffic situation at a somewhat later point in time.

FIG. 3 shows the situation at a somewhat later point in time than in FIG. 2. The velocity of vehicle 10 has decreased, and the distance both to vehicle 28, as well as to vehicle 26 has increased correspondingly. At this point in time, there is a sufficient safety distance to vehicle 26, so that a change to adjacent lane 24 would be possible.

In the meantime, one of radar sensors 14 has located another vehicle 34 that is coming closer from behind in adjacent lane 24. From the absolute velocities of the participating vehicles and the velocities relative to vehicle 10, safety distances, which vehicle 10 must at least observe relative to vehicles 34 and 26, are able to be calculated in accordance with known algorithms. In consideration of these safety distances, only a limited window 36 remains (shown in hatched shading in FIG. 3), within which a change to adjacent lane 24 may be safely made. Window 36 moves with vehicles 26 and 34, and the length thereof may also change over time.

At this point, the turning assistance function again increases the nominal velocity for vehicle 10, thereby allowing it to be adapted to the velocity of window 36. Moreover, the haptic signal output path of lane keeping support LKS via steering wheel 18 is used for transmitting a lane-change request to the driver, thereby prompting him/her to undertake the lane change at the correct instant, as symbolized in FIG. 3 by an arrow indicated by a dot-dash line.

The relative velocities of vehicles 26 and 34 are continually measured and updated with the aid of radar sensors 12 and 14. The absolute velocities of these vehicles are then derived by adding the intrinsic velocity of vehicle 10. Therefore, to determine the optimal point in time for the lane change, turning assistance function 30 is also able to extrapolate into the future the movements of vehicles 26 and 34, as well as the corresponding movements and, as the case may be, the size variations of window 36.

Figure 4:
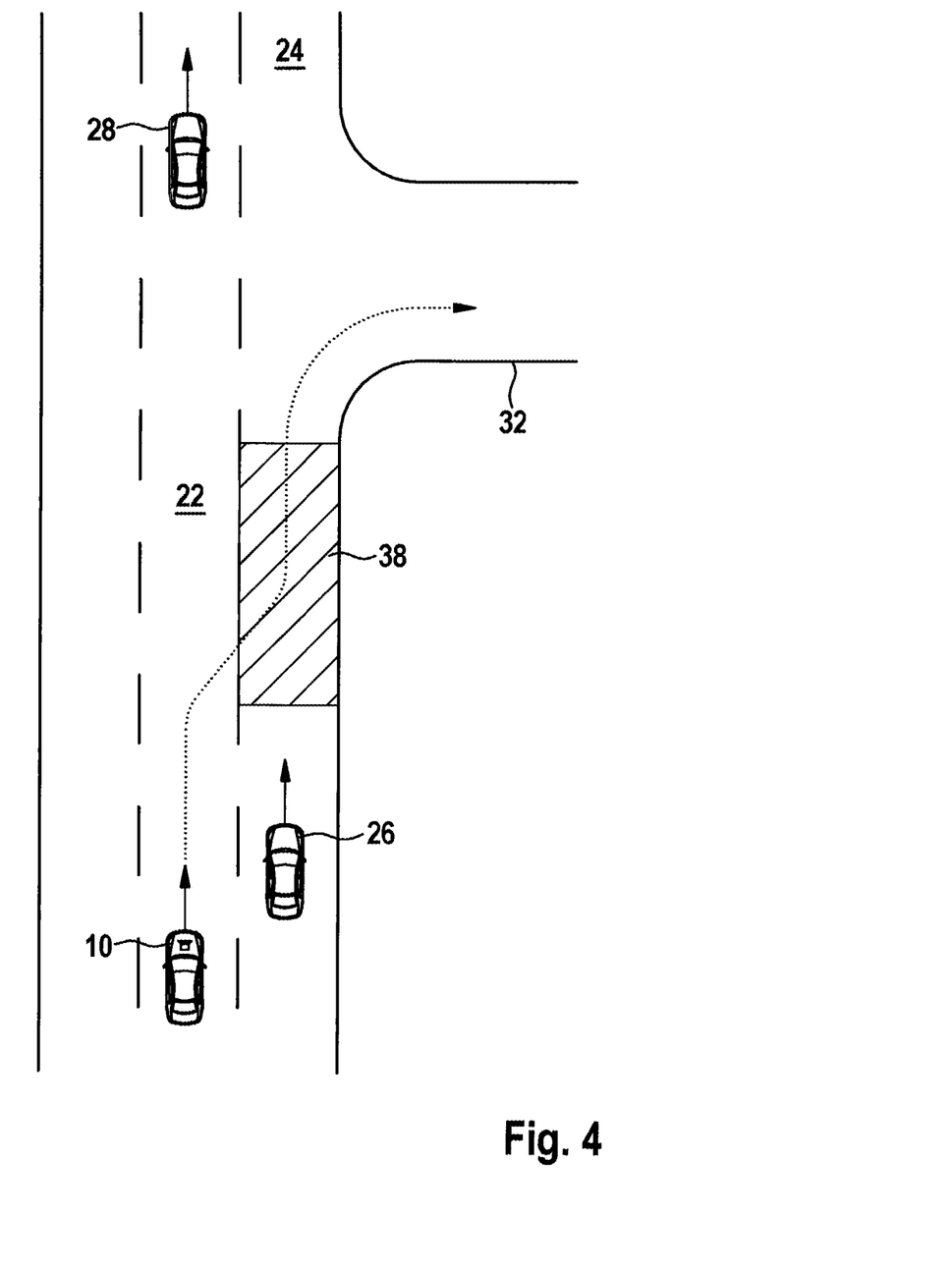
FIG. 4 is a sketch of a traffic situation for clarifying another operation of the turning assistance function.

FIG. 4 illustrates a modified traffic situation that requires a different reaction of turning assistance function 30. In this example, vehicle 26 has a somewhat lower velocity, and the distance between vehicles 10 and 28 is greater than in FIG. 2. Therefore, in this case, there is a large enough window 38 for a change to adjacent lane 24 in front of vehicle 26, as is symbolized in FIG. 4 by an arrow indicated by a dot-dash line. Therefore, the turning assistance function instructs that the nominal velocity be increased, and, as soon as subject vehicle 10 has reached the rear boundary of window 38, the driver receives a lane-change request.

When, at the moment that the navigation system announces an imminent turning process, another vehicle (here vehicle 26) is located in adjacent lane 24, for instance next to, somewhat in front of or somewhat behind subject vehicle 10, then, depending on the traffic situation, the following situations are generally possible. There may be a window 36 behind vehicle 26, as in FIG. 3, or a window 38 in front of this vehicle, as in FIG. 4. However, if the traffic in adjacent lane 24 is very dense, it is also possible that there is not a large enough window in front of nor behind vehicle 26. In such a case, the turning assistance function further decelerates vehicle 10 until a large enough gap 15 opens up in the adjacent lane. Conversely, it is also possible there is a large enough window both in front of vehicle 26, as well as behind the same, so that the turning assistance function must decide which of the two possible windows should be used. The decision is then dependent upon which of the two windows requires changing the velocity of subject vehicle 10 the least.

If there is a speed limit on the traveled route that is captured and reported by the navigation system or by the multifunction video camera, then, in selecting the window, the turning assistance function will also consider that the nominal velocity should not be increased above the authorized speed.

Figure 5:
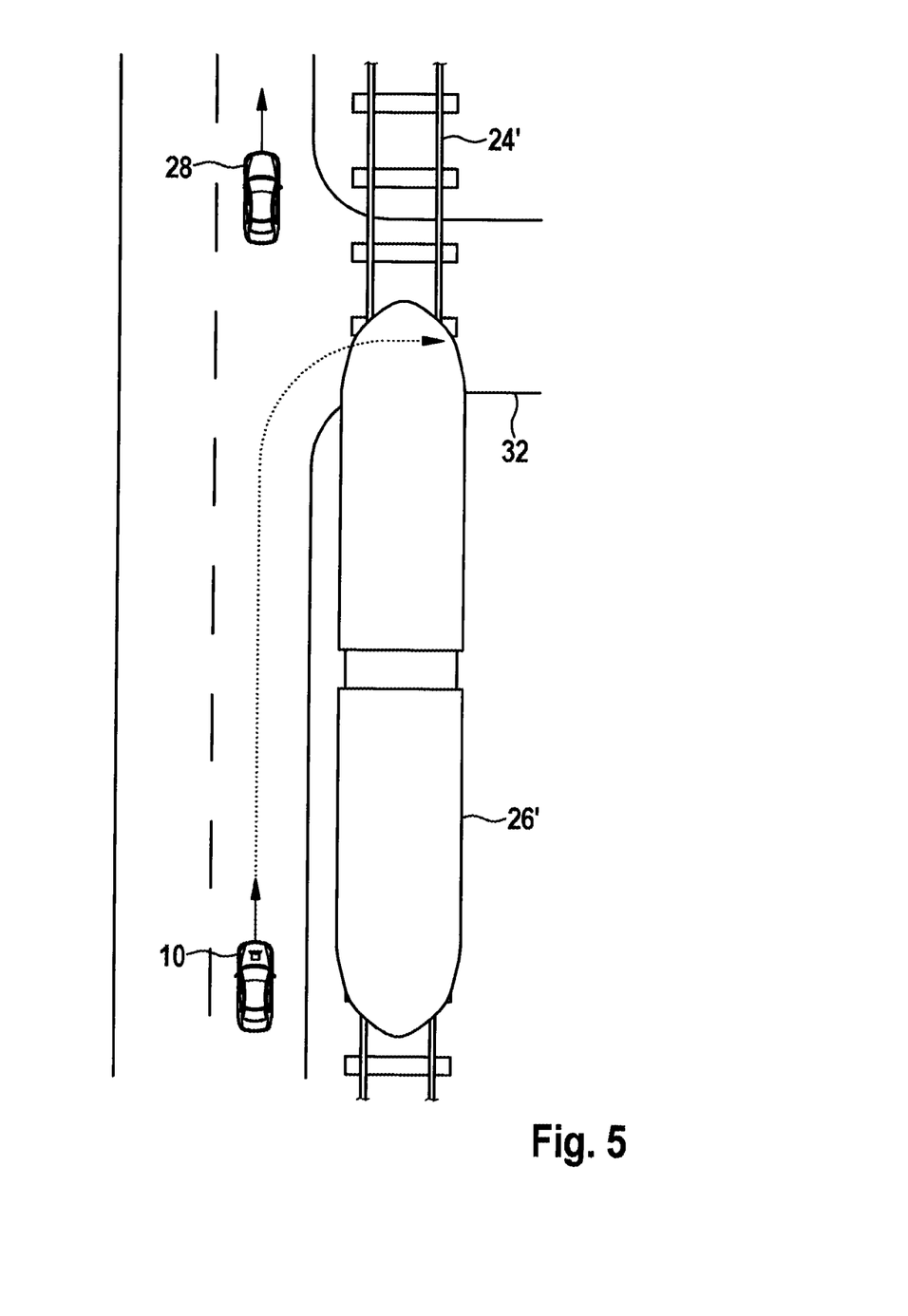
FIG. 5 is a sketch of a traffic situation where a streetcar track must be crossed when turning off.

FIG. 5 illustrates another traffic situation where vehicle 10 is already traveling in the rightmost lane of a two-lane roadway. In this case, an "adjacent lane" 24' is constituted of a streetcar track laid next to the road that must be crossed when turning off into secondary road 32. A streetcar 26' is traveling virtually next to vehicle 10. Here as well, the velocity of vehicle 10 is adapted by the turning assistance function in such a way that the streetcar rail is either crossed behind the streetcar or at an adequate safety distance in front of the same. In contrast to the previously described situations, a slipping into "adjacent lane" 24' is not possible in this case; rather, the streetcar track may only be crossed at that location from where secondary road 32 branches off. The same would also apply if the "adjacent lane" were constituted of a bicycle route, for example.

Figure 6:
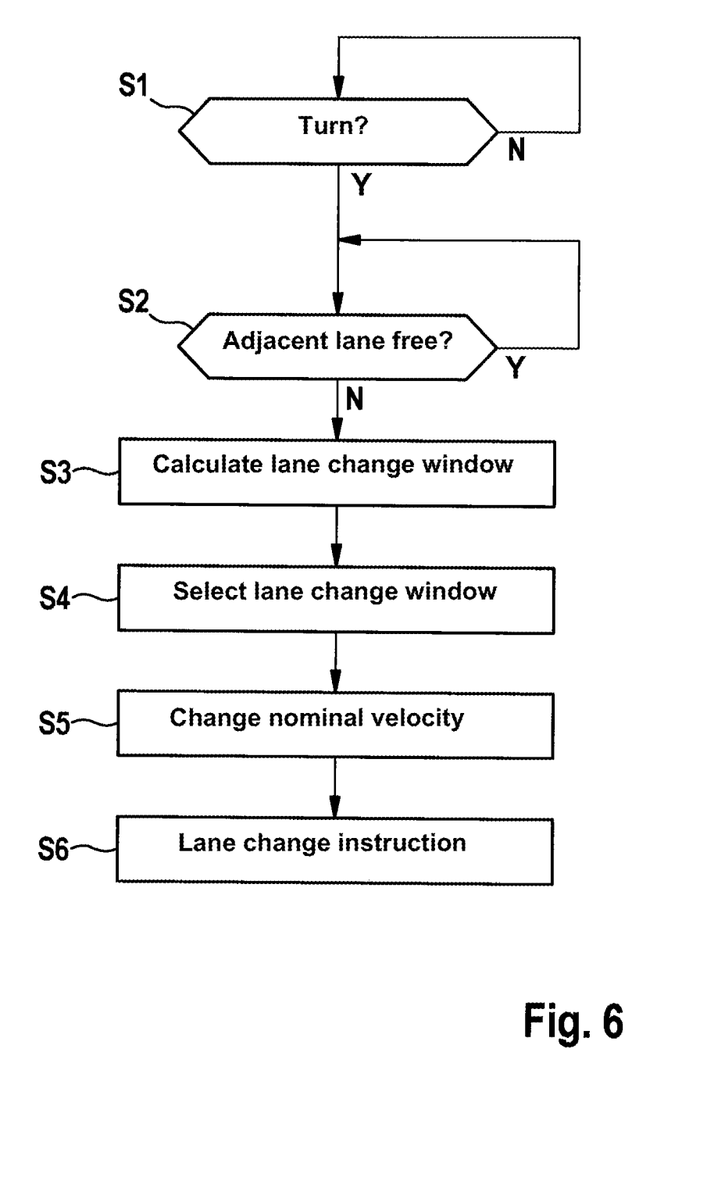
FIG. 6 is a flow chart for illustrating the principle of operation of the turning assistance function.

The essential steps of the turning assistance function are illustrated once again in a flow chart in FIG. 6.

The decision is made in a step S1 as to whether a turning process is imminent. If this is not the case (N), step S1 is repeated until the navigation system or the driver himself/ herself announces a turning process. If this is the case (Y), it is checked in step S2 whether the adjacent lane is free. If this is the case (Y), step S2 is repeated until the lane change to the adjacent lane is concluded.

If the adjacent lane is not free (N), i.e., if at least one other traffic participant, such as vehicle 26, for example, is located in the adjacent lane, then, in step S3, the distance and the relative velocity of this other vehicle, as well as, as the case may be, distances and relative velocities of other vehicles in the adjacent lane are measured; on the basis of the absolute velocities and the relative velocities, the safety distances to be observed in each case are calculated, and, on the basis of the locations of the vehicles in the adjacent lane and the safety distances, windows 36, 38 in the adjacent lane are calculated. To be more precise, the positions of the beginning and the end of each window are calculated as functions of time, so that even the dynamic changes in this window are considered and may be extrapolated into the future.

When at least two large enough windows are present, the most favorably situated window is selected in step S4.

The nominal velocity of the subject vehicle is adapted in step S5 in such a way that the subject vehicle arrives next to the selected window and is then adapted to the velocity of the window, i.e., is adapted to the velocities of the vehicles that bound this window. As soon as the subject vehicle reaches a position and velocity where a safe lane change is possible, the driver receives a lane change instruction in step S6.

In situations where, as in FIG. 5, the adjacent lane may only be crossed, but not driven in, step S6 is eliminated.

What is claimed is:

1. A driver assistance system for a motor vehicle, comprising:
    one or more data processing systems operative to receive input signals from sensory components of the motor vehicle and transmit output signals to actuators of the motor vehicle, wherein said one or more data processing systems are programmed to perform:
    a velocity regulation function regulating a velocity of the motor vehicle to a nominal velocity;
    an adjacent-lane monitoring function; and
    a turning assistance function that, in response to an incoming signal indicating an imminent turning process that requires crossing an adjacent lane, monitors traffic in the adjacent lane with the aid of the adjacent-lane monitoring function, and, as a function of a location-and a velocity of a traffic participant in the adjacent lane, determines two or more spatial and temporal windows located in the adjacent lane for moving the motor vehicle into one of the two or more spatial and temporal windows that are in the adjacent lane, at least one window of said two or more spatial and temporal windows requiring acceleration of the motor vehicle to reach the at least one window, selects one of said two or more spatial and temporal windows based at least in part on a speed limit, and adapts the nominal velocity to the selected one of the two or more spatial and temporal windows,
    wherein the turning assistance function positons at least one of the two or more spatial and temporal windows in the adjacent lane before a side road that branches off the adjacent lane so as to establish a traveling path for the motor vehicle to turn onto the side road through the at least one of the two or more spatial and temporal windows in the adjacent lane.

2. The driver assistance system as recited in claim 1, further comprising a navigation system providing a route planning function generating a signal that indicates the imminent turning process.

3. The driver assistance system as recited in claim 1, where the velocity regulation function includes an adaptive cruise control function for regulating a distance to a vehicle driving ahead in a lane of the motor vehicle including the driver assistance system.

4. The driver assistance system as recited in claim 1, where the adjacent-lane monitoring function includes a blind-spot detection function.

5. The driver assistance system as recited in claim 1, where the adjacent-lane monitoring function includes a lane change assist.

6. The driver assistance system as recited in claim 1, further comprising at least one radar sensor for monitoring a space next to and behind a vehicle in the adjacent lane.

7. The driver assistance system as recited in claim 1, wherein said one or more data processing systems are further programmed to perform:
    an assistance function recognizing the speed limit based on input from at least one of a navigation system or a multifunction video camera, wherein, as a function of a situation, the turning assistance function is adapted for increasing the nominal velocity up to a maximum value that is determined by the speed limit.

8. The driver assistance system as recited in claim 1, where the turning assistance function is adapted for outputting a lane change recommendation to a driver.

9. The driver assistance system as recited in claim 8, wherein said one or more data processing systems are further programmed to perform:
    a lane keeping support function, said driver assistance system further comprising:
    a haptic signal output system that acts on a steering wheel of the motor vehicle and that is utilized by the turning assistance function for outputting the lane change recommendation.

10. The driver assistance system of claim 1, wherein the turning assistance function selects the one of said two or more spatial and temporal windows such that adaptation of the nominal velocity to the selected one of the two or more spatial and temporal windows will not increase the nominal velocity above the speed limit.

11. The driver assistance system of claim 1, wherein the turning assistance function selects the one of the two or more spatial and temporal windows depending on which of the at least one of the two or more windows requires changing the nominal velocity the least.

12. The driver assistance system of claim 1, wherein the at least one window is in front of another vehicle travelling in the adjacent lane, and at least one other window of said two or more spatial and temporal windows is located behind the other vehicle travelling in the adjacent lane.

13. The driver assistance system of claim 1, wherein a rear boundary of at least one of the two or more spatial and temporal windows is located ahead of a front of a vehicle in the adjacent lane, and wherein a rear of the vehicle in the adjacent lane is ahead of a front of the motor vehicle.

* * * * *